(12) United States Patent
Iwai

(10) Patent No.: US 10,270,543 B2
(45) Date of Patent: Apr. 23, 2019

(54) SIGNAL GENERATING APPARATUS AND SIGNAL GENERATING METHOD

(71) Applicant: ANRITSU CORPORATION, Kanagawa (JP)

(72) Inventor: Tatsuya Iwai, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 0 days.

(21) Appl. No.: 15/957,293

(22) Filed: Apr. 19, 2018

(65) Prior Publication Data

US 2018/0367224 A1  Dec. 20, 2018

(30) Foreign Application Priority Data

Jun. 19, 2017 (JP) ................................. 2017-119729

(51) Int. Cl.
*H04B 17/00* (2015.01)
*H04L 27/26* (2006.01)
*H04B 17/10* (2015.01)

(52) U.S. Cl.
CPC ....... *H04B 17/0085* (2013.01); *H04B 17/104* (2015.01); *H04L 27/2636* (2013.01)

(58) Field of Classification Search
USPC ......... 375/224, 316, 300, 296; 370/210, 208
See application file for complete search history.

(56) References Cited

U.S. PATENT DOCUMENTS

| 6,466,629 B1* | 10/2002 | Isaksson | H04L 27/2647 341/155 |
| 2011/0044159 A1* | 2/2011 | Kishiyama | H04J 11/0069 370/208 |
| 2011/0058471 A1* | 3/2011 | Zhang | H04L 25/03834 370/210 |
| 2013/0329832 A1* | 12/2013 | Morita | H04B 1/0475 375/296 |
| 2014/0198881 A1* | 7/2014 | Nishikawa | H04L 27/2636 375/300 |

FOREIGN PATENT DOCUMENTS

JP  2013-201661 A  10/2013

* cited by examiner

*Primary Examiner* — Eva Y Puente
(74) *Attorney, Agent, or Firm* — Pearne & Gordon LLP

(57) ABSTRACT

Provided is a signal generating apparatus including an inverse characteristic calculation unit that sets an amplitude characteristic of a signal as input data to calculate an inverse characteristic of a transfer function from an inverse characteristic of the amplitude characteristic of the input data, an inverse Fourier transform unit that performs inverse Fourier transform of the inverse characteristic of the transfer function, an impulse response extract unit that extracts points corresponding to a desired number of taps on the basis of a peak of the impulse response obtained by the inverse Fourier transform unit, a power spectrum calculation unit that calculates a power spectrum on the basis of values which are extracted from the impulse response, and a loss value correction unit that corrects a loss value of the power spectrum by using a loss value correction curve.

4 Claims, 8 Drawing Sheets

| | ISI(dB) | 1post 1pre(dB) | Tap coefficient addition(dB) | Inverse computational calculation(dB) |
|---|---|---|---|---|
| Tap1 | -0.5 | - | -0.5 | -0.4 |
| Tap2 | -1.2 | - | -1.2 | 1.2 |
| Tap3 | -5.8 | 11.1 | 5.3 | 2.0 |
| Tap4 | Main | Main | Main | Main |
| Tap5 | -6.6 | 11.1 | 4.5 | 2.1 |
| Tap6 | -1.7 | - | -1.7 | 1.5 |
| Tap7 | -0.9 | - | -0.9 | -0.1 |
| Tap8 | -0.4 | - | -0.4 | 0.3 |
| Tap9 | -0.2 | - | -0.2 | 0.1 |
| Tap10 | -0.1 | - | -0.1 | 0.2 |

FIG. 7

SIGNAL GENERATING APPARATUS AND SIGNAL GENERATING METHOD

TECHNICAL FIELD

The present invention relates to a signal generating apparatus and a signal generating method for generating a signal to which InterSymbol Interference (ISI) using a desired loss value (loss amount) based on a transmission standard of a digital signal, such as PCIe Gen 4.0, USB 3.0/3.1, or Thunderbolt, is applied and a signal to which desired emphasis is added in a state where ISI using a desired loss value is applied.

BACKGROUND ART

For example, in devices corresponding to a transmission standard of a digital signal, such as PCIe Gen 4.0, USB 3.0/3.1, or Thunderbolt, which is a measurement target of an error rate measurement apparatus, characteristics of a test board for each transmission standard are evaluated, and thus it is necessary to introduce an ISI calibration channel, which is a test fixture simulating a specified transmission line loss, to the input to the test board.

However, a loss amount of the ISI calibration channel varies depending on a transmission standard. For this reason, a user needs to prepare a loss board of the ISI calibration channel which conforms to a transmission standard, apart from the test board for each transmission standard. Additionally, in preparing the loss board of the ISI calibration channel, troublesome work is caused in which a loss value of loss board is actually measured and it has to be evaluated whether a target loss value is obtained, which has laid a burden on the user.

Incidentally, there has also been desire for performing evaluation by adding not only a loss due to the above-mentioned ISI calibration channel but also emphasis, in evaluating characteristics of a test board for each transmission standard.

As a technique for adding emphasis, for example, an emphasis optimization apparatus disclosed in Patent Document 1 is known. According to the emphasis optimization apparatus, it is possible to bring emphasis close to an optimum value in setting a tap width and an intensity value (modulation amount) for each tap.

RELATED ART DOCUMENT

Patent Document

[Patent Document 1] JP-A-2013-201661

DISCLOSURE OF THE INVENTION

Problem that the Invention is to Solve

However, in the above-described emphasis optimization apparatus disclosed in Patent Document 1, it is not possible to obtain a target amplitude characteristic in a case where an ISI channel is configured using multi-tap emphasis.

Consequently, the invention is contrived in view of the above-mentioned problem, and an object thereof is to provide a signal generating apparatus and a signal generating method which are capable of generating a signal to which ISI using a desired loss value is applied and a signal to which desired emphasis is added in a state where ISI using a desired loss value is applied, without the need to prepare a loss board conforming to a transmission standard of a digital signal.

Means for Solving the Problem

In order to accomplish the above-described object, according to an aspect of the invention, there is provided a signal generating apparatus that generates a signal to which a desired loss value is applied, in order to test a device corresponding to a transmission standard of a digital signal, the signal generating apparatus including an inverse characteristic calculation unit that sets an amplitude characteristic of a signal based on the transmission standard as input data to calculate a transfer function and an inverse characteristic of the transfer function from an inverse characteristic of the amplitude characteristic, an inverse Fourier transform unit that performs inverse Fourier transform of the inverse characteristic of the transfer function which is calculated by the inverse characteristic calculation unit to calculate an impulse response constituted by a plurality of points, an impulse response extract unit that extracts the points corresponding to the number of taps in a desired range from the impulse response, on the basis of a peak of an amplitude of the impulse response obtained by the inverse Fourier transform unit, a signal generation unit that generates a signal by setting tap coefficients, which are calculated on the basis of values of the points corresponding to the number of taps in the desired range which are extracted from the impulse response by the impulse response extract unit, in an FIR filter, a power spectrum calculation unit that calculates an amplitude characteristic of a power spectrum on the basis of the values of the points corresponding to the number of taps in the desired range which are extracted from the impulse response by the impulse response extract unit, and a loss value correction unit that corrects a loss value of the amplitude characteristic of the power spectrum by using a loss value correction curve obtained from a difference value between a set loss value which is a loss value of a target amplitude characteristic in the input data and a loss value of the amplitude characteristic of the power spectrum calculated by the power spectrum calculation unit, in which the signal generation unit sets the tap coefficients of the FIR filter by using the amplitude characteristic of the power spectrum which is corrected by the loss value correction unit to generate a signal.

The signal generating apparatus according to the aspect further includes an amplitude characteristic synthesis unit that feeds back a synthesis amplitude characteristic, which is obtained by synthesizing the amplitude characteristic of the power spectrum which is corrected by the loss value correction unit and a predetermined emphasis amplitude characteristic, to the inverse Fourier transform unit, in which the inverse Fourier transform unit calculates the impulse response by feeding back the synthesis amplitude characteristic to the inverse characteristic calculation unit, the impulse response extract unit extracts the points from the impulse response corresponding to the number of taps in the desired range based on the peak of the amplitude of the impulse response, and the power spectrum calculation unit calculates the amplitude characteristic of the power spectrum based on the values of the points corresponding to the number of taps in the desired range which are extracted from the impulse response.

According to another aspect of the invention, there is provided a signal generating method of generating a signal to which a desired loss value is applied, in order to test a device corresponding to a transmission standard of a digital signal, the signal generating method including setting an amplitude characteristic of a signal based on the transmission standard as input data to calculate a transfer function and an inverse characteristic of the transfer function from an inverse characteristic of the amplitude characteristic, performing inverse Fourier transform of the calculated inverse characteristic of the transfer function to calculate an impulse response constituted by a plurality of points, extracting the points corresponding to the number of taps in a desired range from the impulse response, on the basis of a peak of an amplitude of the impulse response, generating a signal by setting tap coefficients, which are calculated on the basis of values of the points corresponding to the number of taps in the desired range which are extracted from the impulse response, in an FIR filter, calculating an amplitude characteristic of a power spectrum on the basis of the values of the points corresponding to the number of taps in the desired range which are extracted from the impulse response, correcting a loss value of the amplitude characteristic of the power spectrum by using a loss value correction curve obtained from a difference value between a set loss value which is a loss value of a target amplitude characteristic in the input data and a loss value of the amplitude characteristic of the calculated power spectrum, and setting the tap coefficients of the FIR filter by using the corrected amplitude characteristic of the power spectrum to generate a signal.

The signal generating method according to the aspect further includes feeding back a synthesis amplitude characteristic which is obtained by synthesizing the amplitude characteristic of the power spectrum of which the loss value is corrected and a predetermined emphasis amplitude characteristic, calculating the impulse response based on the inverse Fourier transform, extracting the points from the impulse response corresponding to the number of taps in the desired range based on the peak of the amplitude of the impulse response, and calculating the amplitude characteristic of the power spectrum based on the values of the points corresponding to the number of taps in the desired range which are extracted from the impulse response.

Advantage of the Invention

According to the invention, it is possible to obtain a signal to which ISI using a desired loss value based on a transmission standard of a digital signal is applied. In this case, a user does not need to prepare a loss board of an ISI calibration channel conforming to a transmission standard, and thus it is possible to reduce a burden on the user without accompanying troublesome work.

In addition, inverse computational calculation from a synthesis amplitude characteristic to a tap coefficient is performed so as to obtain the synthesis amplitude characteristic obtained by performing amplitude synthesis of an ISI amplitude characteristic and an emphasis amplitude characteristic, and thus it is possible to add desired emphasis compensating for loss values in all taps.

BRIEF DESCRIPTION OF THE DRAWINGS

FIG. 7 is a diagram illustrating an example of a tap coefficient of an ISI channel of 15 dB, a tap coefficient of emphasis (1post 1pre), tap coefficient addition of the tap coefficient of the ISI channel and the tap coefficient of the emphasis, and a tap coefficient based on inverse computational calculation.

BEST MODE FOR CARRYING OUT THE INVENTION

Hereinafter, a mode for carrying out the invention will be described in detail with reference to the accompanying drawings.

A signal generating apparatus and a signal generating method according to the invention are used to generate a signal (a signal of an InterSymbol Interference (ISI) waveform) to which ISI using a desired loss value (loss amount) based on a transmission standard of a digital signal is applied and a signal (a signal of an ISI waveform+an emphasis waveform) to which desired emphasis is added in a state where ISI using a desired loss value is applied. Meanwhile, examples of the transmission standard of the digital signal to which the invention is applied include PCIe Gen 4.0, USB 3.0/3.1, Thunderbolt, and the like.

[With Regard to Configuration of Signal Generating Apparatus]

Figure 1:
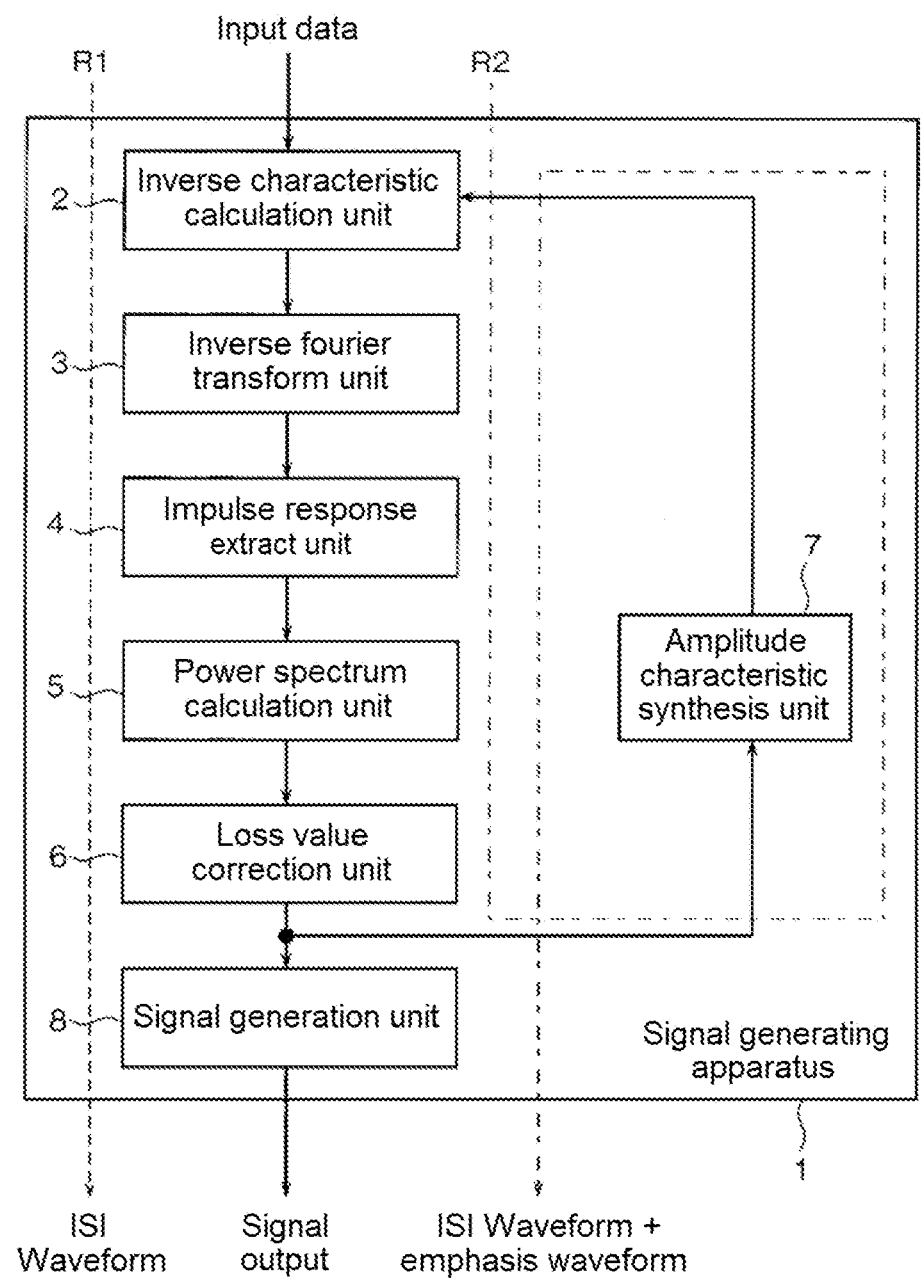
FIG. 1 is a block diagram illustrating a schematic configuration of a signal generating apparatus according to the invention.

As illustrated in FIG. 1, a signal generating apparatus 1 according to this embodiment is used for an error rate measurement apparatus that measures an error rate of a measurement target, a measurement device, such as a sampling oscilloscope, which measures an eye pattern, and the like, and is configured to include an inverse characteristic calculation unit 2, an inverse Fourier transform unit 3, an impulse response extract unit 4, a power spectrum calculation unit 5, a loss value correction unit 6, an amplitude characteristic synthesis unit 7, and a signal generation unit 8.

Meanwhile, in FIG. 1, a processing path for generating a signal of an ISI waveform and a processing path for generating a signal of an ISI waveform+an emphasis waveform are set to be R1 and R2, respectively.

The inverse characteristic calculation unit 2 sets an amplitude characteristic of a signal based on a transmission standard of a digital signal as input data, and calculates an inverse characteristic of a transfer function from an inverse characteristic of the amplitude characteristic of the input data, when a signal of an ISI waveform is generated. In addition, the inverse characteristic calculation unit 2 calculates an inverse characteristic of a transfer function from an inverse characteristic of a synthesis amplitude characteristic which is fed back from the amplitude characteristic synthesis unit 7, when a signal of an ISI waveform+an emphasis waveform is generated.

The inverse Fourier transform unit 3 performs inverse Fourier transform of the inverse characteristic of the transfer function which is calculated from the inverse characteristic of the amplitude characteristic of the input data by the inverse characteristic calculation unit 2 in the processing path R1 to calculate an impulse response, when the signal of an ISI waveform is generated. In addition, the inverse Fourier transform unit 3 performs inverse Fourier transform of the inverse characteristic of the transfer function which is calculated from the inverse characteristic of the synthesis amplitude characteristic by the inverse characteristic calculation unit 2 in the processing path R2 to calculate an impulse response, when the signal of an ISI waveform+an emphasis waveform is generated.

The impulse response extract unit 4 extracts points corresponding to a desired number of taps (for example, ten taps: 6post 3pre) on the basis of a peak of the impulse response obtained by the inverse Fourier transform unit 3 in the processing path R1, when the signal of an ISI waveform is generated. In addition, the impulse response extract unit 4 extracts points corresponding to a desired number of taps (for example, ten taps: 6post 3pre) on the basis of a peak of the impulse response obtained by the inverse Fourier transform unit 3 in the processing path R2, when the signal of an ISI waveform+an emphasis waveform is generated.

A value obtained by extracting the impulse response is set to be a filter coefficient of a Finite impulse response (FIR) filter that distorts an input waveform to a test board, and is used to obtain a tap coefficient. The tap coefficient can be calculated and set by a well-known method of the related art for obtaining a ratio of gains to losses from a main tap on the basis of the main tap. Meanwhile, the tap coefficient indicates what gain/loss each tap has, in taps positioned before and after the main tap. In addition, the main tap is equivalent to a peak of an amplitude of an impulse response.

The power spectrum calculation unit 5 calculates a power spectrum on the basis of the value which is extracted from the impulse response by the impulse response extract unit 4 having the processing path R1, when the signal of an ISI waveform is generated. In addition, the power spectrum calculation unit 5 calculates a power spectrum on the basis of the value which is extracted from the impulse response by the impulse response extract unit 4 in the processing path R2, when the signal of an ISI waveform+an emphasis waveform is generated.

Figure 2:
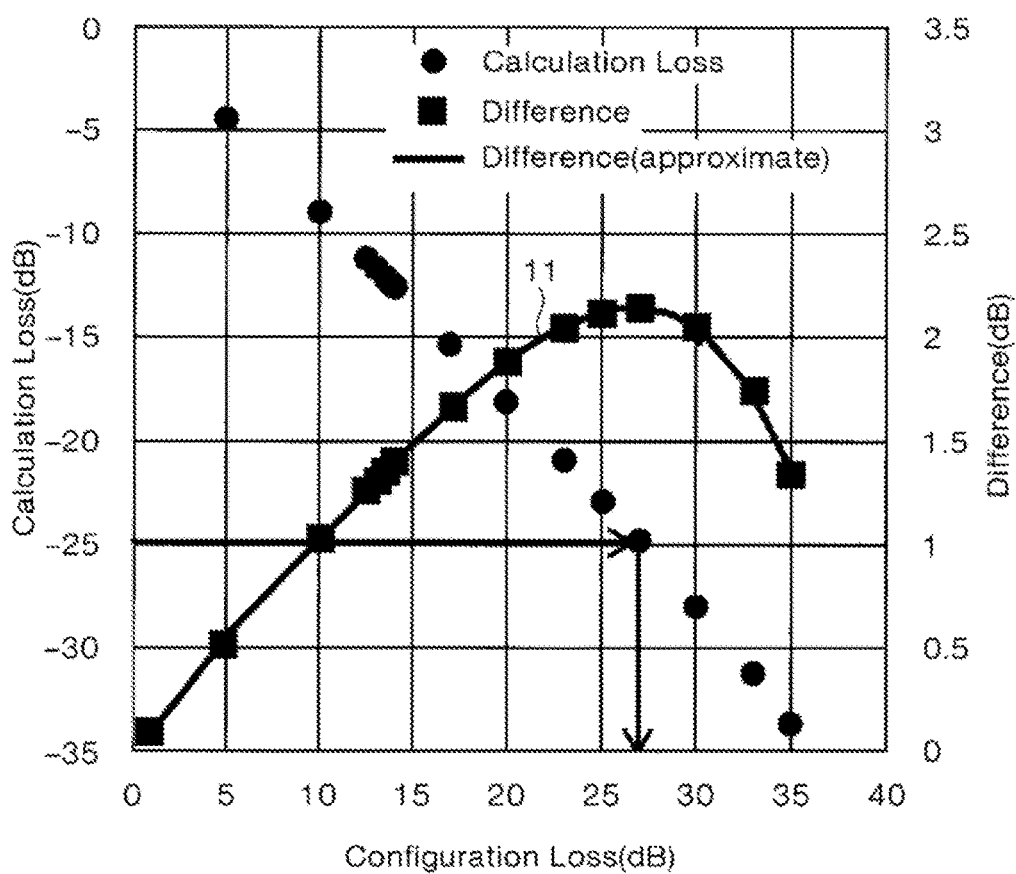
FIG. 2 is a diagram illustrating an example of a loss value correction curve used in the invention.

The loss value correction unit 6 corrects a loss value of the power spectrum calculated by the power spectrum calculation unit 5 in the processing path R1 by using the loss value correction curve 11 illustrated in FIG. 2, when the signal of an ISI waveform is generated in the processing path R1.

The loss value correction curve 11 is constituted by an approximate curve created using a known processing unit, software, or the like from a difference value (an error with respect to a set loss value) between a target loss value (a set loss value: the vertical axis of FIG. 2) desired to be set in an amplitude characteristic of input data and a real loss value (correction loss value: the horizontal axis in FIG. 2) with respect to the set loss value. Since the loss value correction curve 11 changes depending on the number of taps without depending on a frequency, the loss value correction curve is stored in advance as data which is tabled for each number of taps or is calculated through calculation in accordance with a desired number of taps every time. FIG. 2 illustrates the loss value correction curve 11 in a case where the number of taps is 10.

Meanwhile, in creating the loss value correction curve 11, it is particularly preferable to increase the level of accuracy by obtaining a large number of points in the vicinity of a change point so as to fall within an allowable error range (for example, ±0.5 dB) of a transmission standard of a digital signal.

The amplitude characteristic synthesis unit 7 synthesizes (addition of amplitude characteristics) an amplitude characteristic of the power spectrum corrected by the loss value correction unit 6 in the processing path R1 and a predetermined emphasis amplitude characteristic (for example, 1post 1pre, 2post 1pre, or the like), and feeds back the synthesized synthesis amplitude characteristic to the inverse Fourier transform unit 3.

Figure 3:
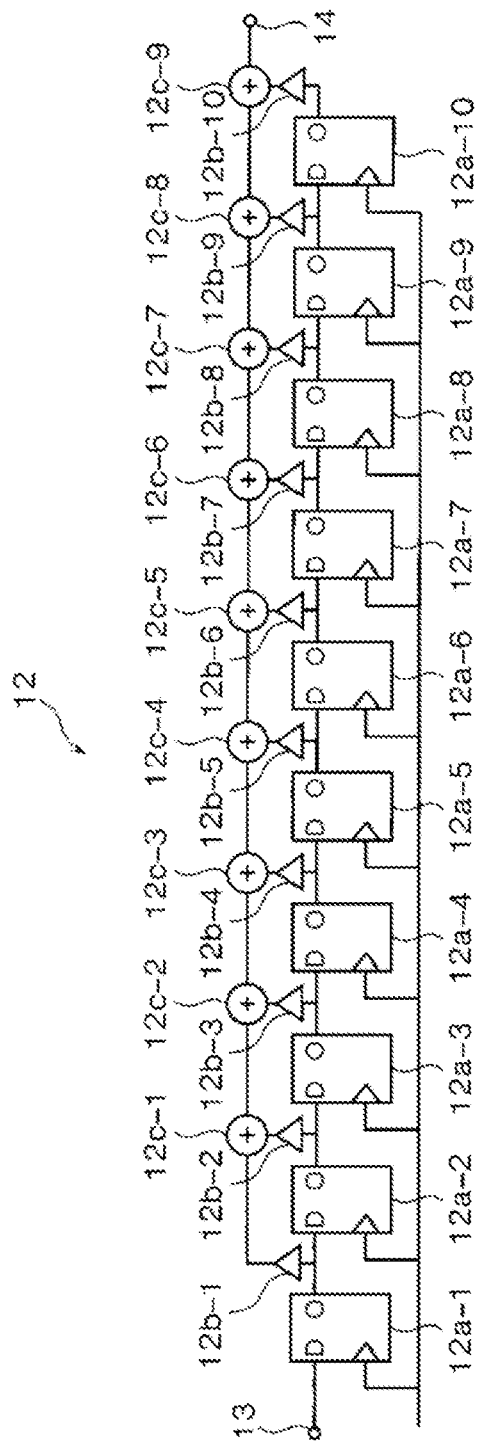
FIG. 3 is a diagram illustrating a configuration example of a FIR filter used in the invention.
Figure 4A:
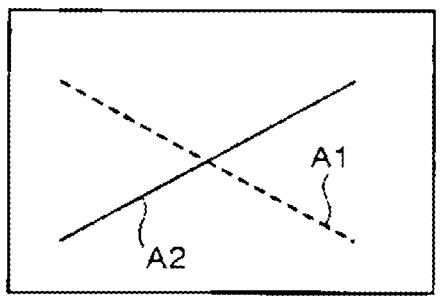
FIGS. 4A to 4D are schematic diagrams illustrating a portion of a processing procedure when a signal of an ISI waveform is generated in the invention.
Figure 4B:
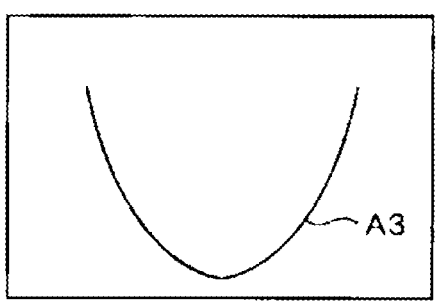
Figure 4C:
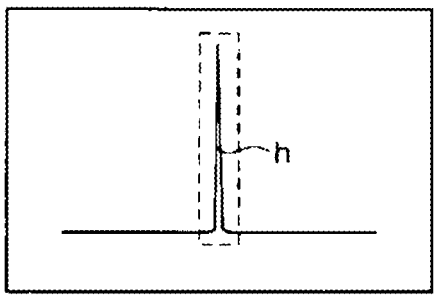
Figure 4D:
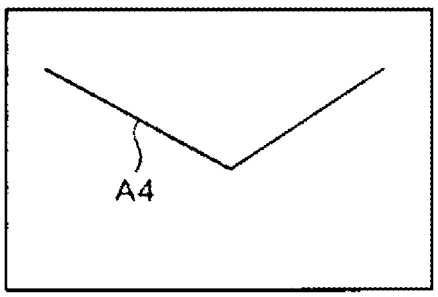

The signal generation unit 8 includes an FIR filter 12 illustrated in FIG. 3, and generates a signal of an ISI waveform based on a desired transmission standard for distorting an input waveform to a test board and a signal of an ISI waveform+an emphasis waveform, on the basis of a tap coefficient which is set in the FIR filter 12.

For example, in a case of ten taps, the FIR filter 12 includes ten delay circuits 12a-1, 12a-2, 12a-3, 12a-4, 12a-5, 12a-6, 12a-7, 12a-8, 12a-9, and 12a-10, such as D type flip-flops, ten multipliers 12b-1, 12b-2, 12b-3, 12b-4, 12b-5, 12b-6, 12b-7, 12b-8, 12b-9, and 12b-10, and nine adders 12c-1, 12c-2, 12c-3, 12c-4, 12c-5, 12c-6, 12c-7, 12c-8, and 12c-9 as illustrated in FIG. 3, and forms ten taps by connecting, in series, the ten delay circuits 12a-1, 12a-2, 12a-3, 12a-4, 12a-5, 12a-6, 12a-7, 12a-8, 12a-9, and 12a-10 between the input terminal 13 and the output terminal 14. The ten multipliers 12b-1, 12b-2, 12b-3, 12b-4, 12b-5, 12b-6, 12b-7, 12b-8, 12b-9, and 12b-10 for multiplying tap coefficients which are set in respective taps together are connected. In addition, outputs at front and rear stages of the ten multipliers 12b-1, 12b-2, 12b-3, 12b-4, 12b-5, 12b-6, 12b-7, 12b-8, 12b-9, and 12b-10 are connected to the corresponding stages of the nine adders 12c-1, 12c-2, 12c-3, 12c-4, 12c-5, 12c-6, 12c-7, 12c-8, and 12c-9. The sum of multiplication results of the ten multipliers 12b-1, 12b-2, 12b-3, 12b-4, 12b-5, 12b-6, 12b-7, 12b-8, 12b-9, and 12b-10 is calculated and output.

Next, reference will be made to FIGS. 4A to 4D to describe a method of generating a signal of an ISI waveform in the processing path R1 by using the signal generating apparatus 1 configured as described above.

Step 1: The inverse characteristic calculation unit 2 calculates an inverse characteristic A3 (FIG. 4B) of a transfer function from an inverse characteristic (a solid line in FIG. 4A: A2) of an amplitude characteristic (a dashed line in FIG. 4A: A1) of a signal (input data) based on a transmission standard of a digital signal.

Step 2: The inverse Fourier transform unit 3 calculates an impulse response h (FIG. 4C) by performing inverse Fourier transform of the inverse characteristic of the transfer function which is calculated from the inverse characteristic of the amplitude characteristic of the input data in step 1.

Step 3: The impulse response extract unit 4 extracts points (points surrounded by a dotted line in FIG. 4C) corresponding to a desired number of taps (for example, ten taps: 6post 3pre) on the basis of a peak of the impulse response calculated in step 2.

Step 4: The power spectrum calculation unit 5 calculates a power spectrum A4 (FIG. 4D) on the basis of the value which is extracted from the impulse response in step 3.

Step 5: The loss value correction unit 6 corrects a loss value of the power spectrum calculated in step 4 by using the loss value correction curve 11 illustrated in FIG. 2.

Figure 5:
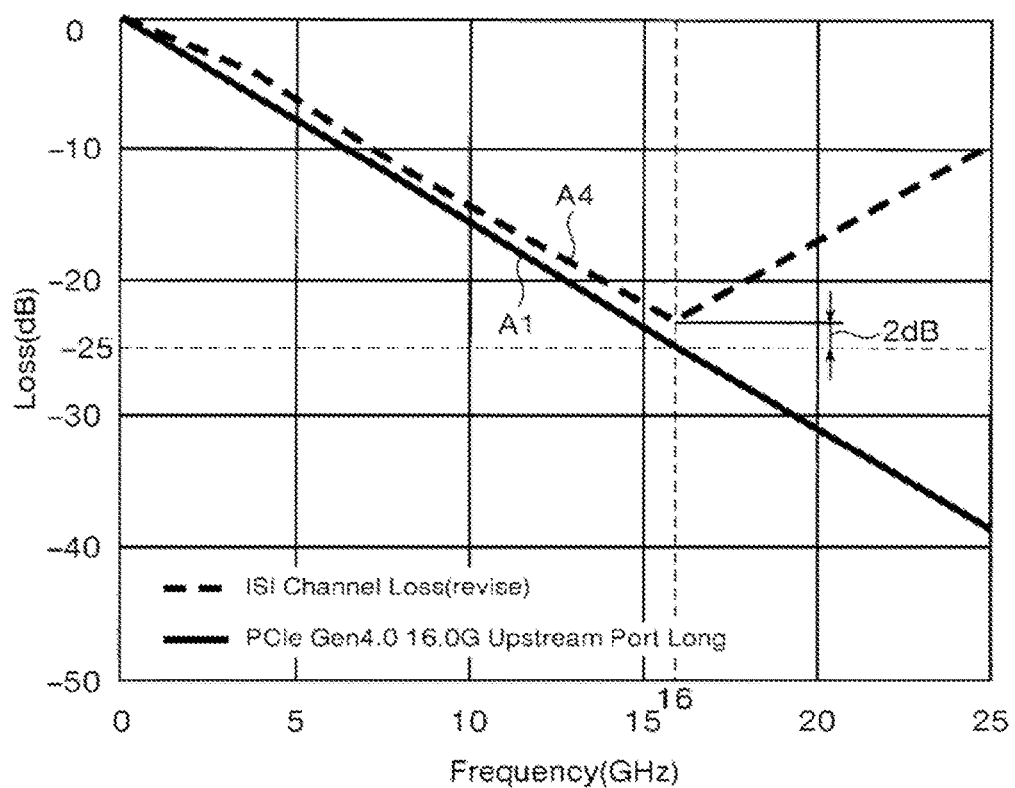
FIG. 5 is a diagram illustrating an example of an amplitude characteristic in a case where the correction of a loss value based on the loss value correction curve of FIG. 2 is not performed.

Here, in a case where a signal of an ISI waveform having a set loss value of 25 dB at ten taps and 16 GHz (a frequency of a half of a bit rate to be measured), results in a case where the loss value correction unit 6 does not correct a loss value based on the loss value correction curve 11 are illustrated in FIG. 5.

As illustrated in FIG. 5, it can be understood that a loss value at 16 GHz is approximately 23 dB and is insufficient by 2 dB with respect to a set loss value of 25 dB. This is because a rounding error occurs on ten taps when a power spectrum is obtained by the power spectrum calculation unit 5. The rounding error is caused by the incapability of taking measures for increasing the number of taps, such as a semiconductor incapable of being provided due to hardware restriction or an increase in power consumption.

Figure 6:
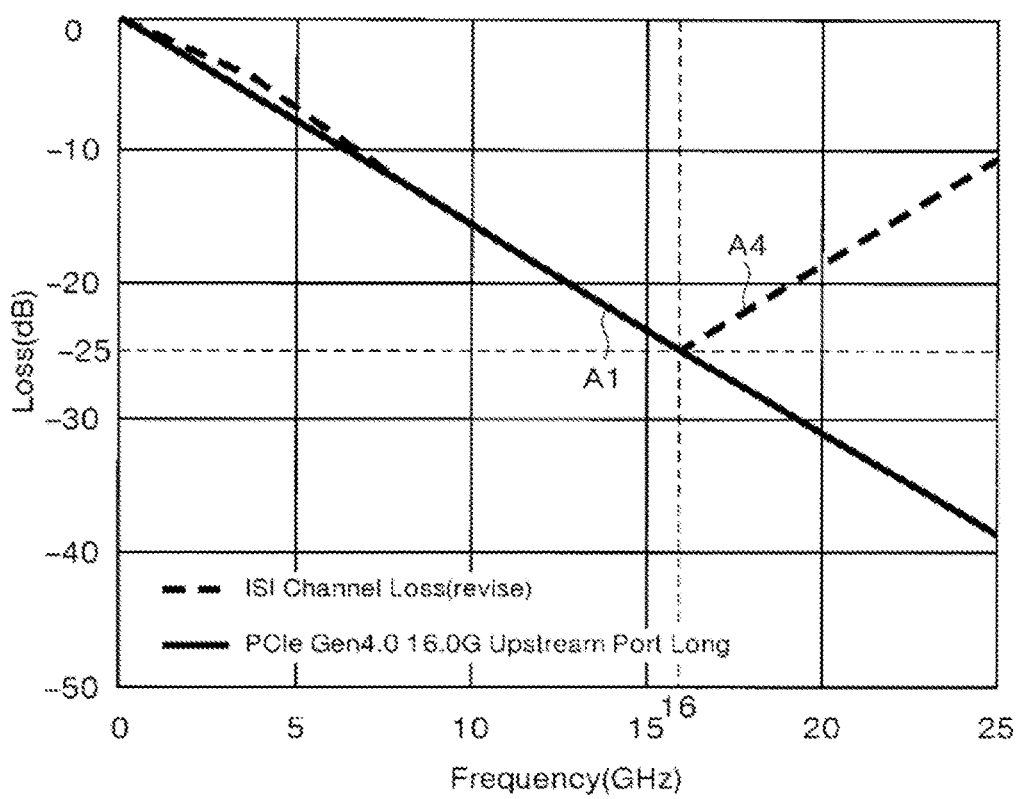
FIG. 6 is a diagram illustrating an example of an amplitude characteristic in a case where the correction of a loss value based on the loss value correction curve of FIG. 2 is performed.

Consequently, in this embodiment, in order to eliminate the above-described rounding error, the set loss value of 25 dB in FIG. 2 is set to be a correction loss value of 27 dB, and the correction of a loss value using the loss value correction curve 11 is performed by the loss value correction unit 6. Thereby, as illustrated in FIG. 6, it is possible to set the loss value of 25 dB at 16 GHz as expected.

Step 6: The signal generation unit 8 sets the calculated tap coefficient in the FIR filter 12, and generates a signal of an ISI waveform based on a desired transmission standard.

Next, a description will be given of a method of compensating for loss values in all taps to add emphasis and generating a signal of an ISI waveform+an emphasis waveform in the processing path R2 by using the signal generating apparatus 1 configured as described above.

First, in this embodiment, it is considered that loss values in all taps are compensated for to add emphasis. In this case, a method of obtaining each tap coefficient is completely the same method used when the above-described signal of an ISI waveform is generated. However, in general, emphasis setting such as 1post 1pre or 2post 1pre is main in various transmission standards, and it is difficult to consider perform compensation using all taps (for example, ten taps).

In this case, there is no particular problem with the tap coefficient as long as emphasis is applied by using an external ISI channel as an input signal. However, as in this embodiment, in a case where an ISI channel is configured using multi-tap (for example, ten taps) emphasis, it does mean that a tap coefficient in the ISI channel and a tap coefficient in the emphasis setting which are illustrated in FIG. 7 may be simply added up.

Figure 8:
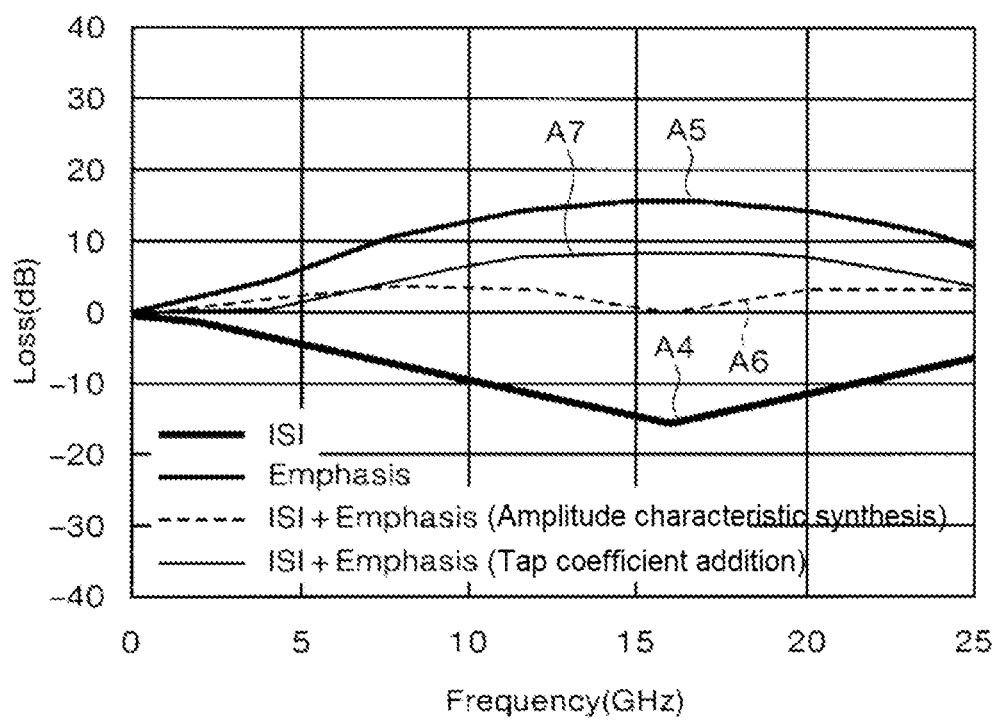
FIG. 8 is a diagram illustrating an ISI amplitude characteristic, an emphasis amplitude characteristic, a synthesis amplitude characteristic obtained by performing amplitude synthesis of the ISI amplitude characteristic and the emphasis amplitude characteristic, and an amplitude characteristic when tap coefficients of the ISI amplitude characteristic and the emphasis amplitude characteristic are simply added up.

That is, in a synthesis amplitude characteristic (a dotted line in FIG. 8: A6) obtained by simply adding up an ISI amplitude characteristic (A4 in FIG. 8) and an emphasis amplitude characteristic (A5 in FIG. 8), a loss value is approximately 0 dB at a target frequency (16 GHz), and thus it can be seen that a desired amplitude characteristic is obtained. On the other hand, in an amplitude characteristic (A7 in FIG. 8) obtained by simply adding up the tap coefficient in the ISI channel and the tap coefficient in the emphasis setting which are illustrated in FIG. 7, an overcompensation state where a gain is applied at a target frequency (16 GHz) is set. That is, it can be seen that it is not possible to correctly perform compensation by only performing simple addition of dB.

Consequently, in this embodiment, inverse computational calculation from a synthesis amplitude characteristic to a tap coefficient is performed as described below. That is, a method is adopted in which a synthesis amplitude characteristic of an ISI amplitude characteristic and an emphasis amplitude characteristic is fed back to the inverse characteristic calculation unit 2 to acquire a tap coefficient again by using the procedure (processing path R2) illustrated in FIG. 1, and a signal of an ISI waveform+an emphasis waveform is generated.

Thereby, as seen from FIG. 7, it is possible to consequently obtain an amplitude characteristic of 1post 1pre by operating all tap coefficients. As a result, it is possible to realize an ISI calibration channel based on multi-tap emphasis in which emphasis is added in a state where ISI is applied. Hereinafter, a description will be given of a method of generating a signal of an ISI waveform+an emphasis waveform by compensating for loss values in all taps to add emphasis.

Step 11: The inverse characteristic calculation unit 2 calculates an inverse characteristic A3 (FIG. 4B) of a transfer function from an inverse characteristic (a solid line in FIG. 4A: A2) of an amplitude characteristic (a dashed line in FIG. 4A: A1) of a signal (input data) based on a transmission standard of a digital signal.

Step 12: The inverse Fourier transform unit 3 calculates an impulse response h (FIG. 4C) by performing inverse Fourier transform of the inverse characteristic of the transfer function which is calculated from the inverse characteristic of the amplitude characteristic of the input data in step 11.

Step 13: The impulse response extract unit 4 extracts points (points surrounded by a dotted line in FIG. 4C) corresponding to a desired number of taps (for example, ten taps: 6post 3pre) on the basis of a peak of the impulse response calculated in step 12.

Step 14: The power spectrum calculation unit 5 calculates a power spectrum A4 (FIG. 4D) on the basis of the value which is extracted from the impulse response in step 13.

Step 15: The loss value correction unit 6 corrects a loss value of the power spectrum calculated in step 14 by using the loss value correction curve 11 illustrated in FIG. 2.

Step 16: The amplitude characteristic synthesis unit 7 synthesizes an amplitude characteristic (ISI amplitude characteristics) of the power spectrum corrected by the loss value correction unit 6 and an emphasis amplitude characteristic (an emphasis amplitude characteristic such as 1post 1pre or 2post 1pre) and feeds back the synthesized synthesis amplitude characteristic to the inverse Fourier transform unit 3.

Step 17: The inverse characteristic calculation unit 2 calculates an inverse characteristic of a transfer function from an inverse characteristic of the synthesis amplitude characteristic which is fed back from the amplitude characteristic synthesis unit 7.

Step 18: The inverse Fourier transform unit 3 calculates an impulse response by performing inverse Fourier transform of the inverse characteristic of the transfer function which is calculated from the inverse characteristic of the synthesis amplitude characteristic.

Step 19: The impulse response extract unit 4 extracts points corresponding to a desired number of taps (for example, ten taps: 6post 3pre) from a peak of the impulse response.

Step 20: The power spectrum calculation unit 5 calculates a power spectrum (an amplitude characteristic indicated by a dotted line in FIG. 8) on the basis of the value which is extracted from the impulse response.

Step 21: The signal generation unit 8 sets the calculated tap coefficient in the FIR filter 12, and generates a signal of an ISI waveform+an emphasis waveform based on a desired transmission standard.

In this manner, in the signal generating apparatus 1 in this embodiment, the correction of a loss value is performed using a loss value correction curve so that a rounding error occurring when obtaining a power spectrum is canceled. Thereby, it is possible to obtain a signal to which ISI using a desired loss value based on a transmission standard of a digital signal is applied. In this case, a user does not need to prepare a loss board of an ISI calibration channel conforming to a transmission standard, apart from a test board for each transmission standard, and thus it is possible to eliminate a burden on the user without accompanying troublesome work.

In the signal generating apparatus 1 according to this embodiment, inverse computational calculation from a synthesis amplitude characteristic to a tap coefficient is performed so as to obtain the synthesis amplitude characteristic obtained by performing amplitude synthesis of an ISI amplitude characteristic and an emphasis amplitude characteristic. Thereby, it is possible to add desired emphasis compensating for loss values in all taps.

While the preferred mode for the signal generating apparatus and the signal generating method according to the invention has been described, the invention is not limited by the description and drawings based on the mode. That is, it is a matter of course that other modes, examples, operation techniques, and the like which are conducted by one skilled in the art and the like on the basis of the mode are all included in the scope of the invention.

DESCRIPTION OF REFERENCE NUMERALS AND SIGNS

1: signal generating apparatus
2: inverse characteristic calculation unit
3: inverse Fourier transform unit
4: impulse response extract unit
5: power spectrum calculation unit
6: loss value correction unit
7: amplitude characteristic synthesis unit
8: signal generation unit
11: loss value correction curve
12: FIR filter
12a-1, 12a-2, 12a-3, 12a-4, 12a-5, 12a-6, 12a-7, 12a-8, 12a-9, 12a-10: delay circuit
12b-1, 12b-2, 12b-3, 12b-4, 12b-5, 12b-6, 12b-7, 12b-8, 12b-9, 12b-10: multiplier
12c-1, 12c-2, 12c-3, 12c-4, 12c-5, 12c-6, 12c-7, 12c-8, 12c-9: adder
13: input terminal
14: output terminal
R1, R2: processing path
A1: amplitude characteristic of input data
A2: inverse characteristic of input data
A3: inverse characteristic of transfer function of inverse characteristic of input data
A4: ISI amplitude characteristic
A5: emphasis amplitude characteristic
A6: synthesis amplitude characteristic
A7: amplitude characteristic obtained by adding up tap coefficient of ISI and tap coefficient of emphasis

What is claimed is:

1. A signal generating apparatus that generates an output signal to which a desired loss value is applied, in order to test a device corresponding to a transmission standard of a digital signal, the signal generating apparatus comprising:

an inverse characteristic calculation unit that sets an amplitude characteristic of an input signal based on the transmission standard as input data to calculate a transfer function and an inverse characteristic of the transfer function from an inverse characteristic of the amplitude characteristic;

an inverse Fourier transform unit that performs inverse Fourier transform of the inverse characteristic of the transfer function which is calculated by the inverse characteristic calculation unit to calculate an impulse response constituted by a plurality of points;

an impulse response extract unit that extracts the points corresponding to the number of taps in a desired range from the impulse response, on the basis of a peak of an amplitude of the impulse response obtained by the inverse Fourier transform unit;

a signal generation unit that generates the output signal by setting tap coefficients, which are calculated on the basis of values of the points corresponding to the number of taps in the desired range which are extracted from the impulse response by the impulse response extract unit, in an FIR filter;

a power spectrum calculation unit that calculates an amplitude characteristic of a power spectrum on the basis of the values of the points corresponding to the number of taps in the desired range which are extracted from the impulse response by the impulse response extract unit; and a loss value correction unit that corrects a loss value of the amplitude characteristic of the power spectrum by using a loss value correction curve obtained from a difference value between a set loss value which is a loss value of a target amplitude characteristic in the input data and a loss value of the amplitude characteristic of the power spectrum calculated by the power spectrum calculation unit, wherein the signal generation unit sets the tap coefficients of the FIR filter by using the amplitude characteristic of the power spectrum which is corrected by the loss value correction unit to generate the output signal.

2. The signal generating apparatus according to claim 1, further comprising:

an amplitude characteristic synthesis unit that feeds back a synthesis amplitude characteristic, which is obtained by synthesizing the amplitude characteristic of the power spectrum which is corrected by the loss value correction unit and a predetermined emphasis amplitude characteristic, to the inverse Fourier transform unit, wherein the inverse Fourier transform unit calculates the impulse response by feeding back the synthesis amplitude characteristic to the inverse characteristic calculation unit, the impulse response extract unit extracts the points from the impulse response corresponding to the number of taps in the desired range based on the peak of the amplitude of the impulse response, and the power spectrum calculation unit calculates the amplitude characteristic of the power spectrum based on the values of the points corresponding to the number of taps in the desired range which are extracted from the impulse response.

3. A signal generating method of generating an output signal to which a desired loss value is applied, in order to test a device corresponding to a transmission standard of a digital signal, the signal generating method comprising:

a step of setting an amplitude characteristic of an input signal based on the transmission standard as input data to calculate a transfer function and an inverse characteristic of the transfer function from an inverse characteristic of the amplitude characteristic;

a step of performing inverse Fourier transform of the calculated inverse characteristic of the transfer function to calculate an impulse response constituted by a plurality of points;

a step of extracting the points corresponding to the number of taps in a desired range from the impulse response, on the basis of a peak of an amplitude of the impulse response;

a step of generating the output signal by setting tap coefficients, which are calculated on the basis of values of the points corresponding to the number of taps in the desired range which are extracted from the impulse response, in an FIR filter;

a step of calculating an amplitude characteristic of a power spectrum on the basis of the values of the points corresponding to the number of taps in the desired range which are extracted from the impulse response;

a step of correcting a loss value of the amplitude characteristic of the power spectrum by using a loss value correction curve obtained from a difference value between a set loss value which is a loss value of a target amplitude characteristic in the input data and a loss value of the amplitude characteristic of the calculated power spectrum; and a step of setting the tap coefficients of the FIR filter by using the corrected amplitude characteristic of the power spectrum to generate the output signal.

4. The signal generating method according to claim 3, further comprising:

a step of feeding back a synthesis amplitude characteristic which is obtained by synthesizing the amplitude characteristic of the power spectrum of which the loss value is corrected and a predetermined emphasis amplitude characteristic, calculating the impulse response based on the inverse Fourier transform, extracting out the points from the impulse response corresponding to the number of taps in the desired range based on the peak of the amplitude of the impulse response, and calculating the amplitude characteristic of the power spectrum based on the values of the points corresponding to the number of taps in the desired range which are extracted from the impulse response.

* * * * *